June 13, 1972 MEGUMU SHIO 3,669,524
BRIGHT ILLUMINATOR FOR MICROSCOPES
Filed Aug. 5, 1970

3,669,524
BRIGHT ILLUMINATOR FOR MICROSCOPES
Megumu Shio, Tokyo, Japan, assignor to Nippon Kogaku K.K., Tokyo, Japan
Filed Aug. 5, 1970, Ser. No. 61,280
Claims priority, application Japan, Aug. 8, 1969, 44/74,827
Int. Cl. G02b 21/12
U.S. Cl. 350—87                            1 Claim

ABSTRACT OF THE DISCLOSURE

This invention provides a high brightness illuminating device for microscopes. The device includes a light source, a condenser system consisting of a condenser lens and a collector lens, an iris diaphragm, a heat ray absorbing filter, a light guide and a cylindrical mirror. The iris diaphragm and the filter are placed between the collector lens and the cendenser lens. One end of the light guide is placed very close to the condenser lens and at the other end of the light guide the cylindrical mirror is placed. The cylindrical mirror has a finished and chromium plated mirror surface and entrance surface functioning as diffuser.

BACKGROUND OF THE INVENTION

Field of the invention

The present invention relates to a bright illuminator for use with microscopes.

Description of the prior arts

A point source of light such as xenon and ultra-high-pressure mercury arcs is generally used for photomicroscopy so that the critical and Köhler's methods are employed so as to focus the image of the light source in the plane of the specimen. For high magnification, the critical illumination is advantageous, but the specimen is heated or the stained specimen is faded. In case of the living cells, they may be killed or dehydrated. Furthermore, a bright field cannot be obtained for low magnification because of the point source of light. In Köhler's system, the condensers must be switched depending upon the objective lenses used. Alternatively, a zoom type condenser lens system must be used so that both the desired field and numerical aperture may be obtained. Thus, the Köhler's system is complex in construction and whenever the objective lenses are changed, the condenser system or systems must be suitably selected.

SUMMARY OF THE INVENTION

One of the objects of the present invention is therefore to provide an illuminator for microscopes which can illuminate the specimen without operating the condenser system even when the objective lenses are changed and which will not adversely heat the specimen.

In brief, the present invention provides an illuminator for microscopes in which an iris diaphragm and a heat ray absorbing filter are interposed in a condenser system (comprising a collector lens and condenser lenses) so that the source may be focused uniformly upon one end of a light guide with the heat rays being absorbed to some extent, a cylindrical mirror having a peripheral surface so finished as to give a mirror surface and then plated with chromium and an entrance surface which serves as a diffuser is disposed adjacent to the other end of the light guide so that said entrance surface is uniformly illuminated whereby a bright field having the same area as the aperture of the cylindrical mirror and a greater aperture angle may be obtained without being heated.

DESCRIPTION OF THE PREFERRED EMBODIMENT

Figure 2:
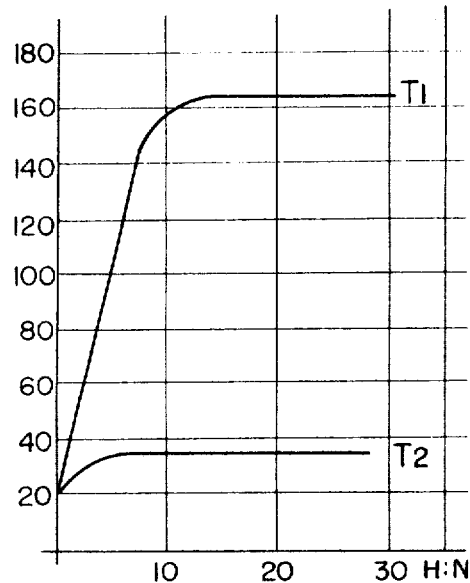
FIG. 2 is a graph illustrating the temperature rise at the entrance and exit of a light guide thereof.
Figure 1:
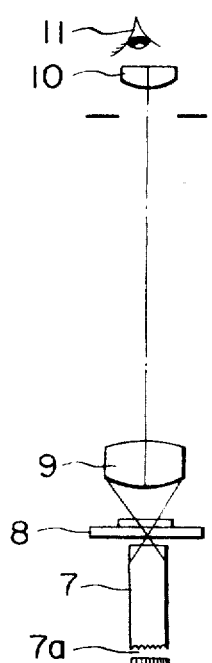
FIG. 1 is a diagrammatic view illustrating an optical system of one embodiment of the present invention.
Figure 1:
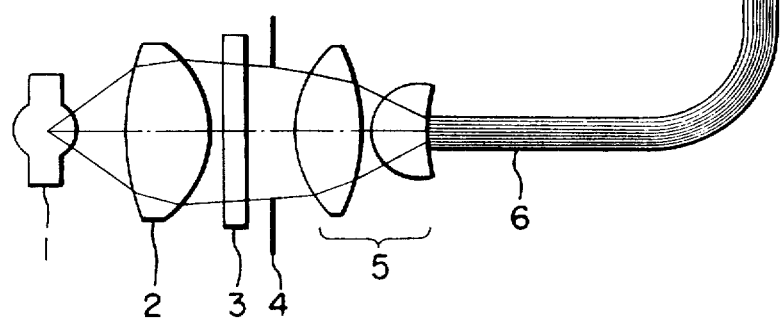

Referring to FIG. 1, reference numeral 1 designates a point source of light such as xenon lamp or ultra-high-pressure mercury lamp with a very bright intensity; 2, a collector lens; and 5, a condenser lens which constitutes one condenser system together with the collector lens 2.3 is a heat insulating filter and an iris adjustable diaphragm 4 is interposed between the collector lens 2 and the condenser lens 5. 6 is a light guide (optical fibers made of glass fibers) whose one end is fixed to one surface of the condenser lens 5 and is adjacent to the focus of the condenser optical system. However, it is not necessary to fix the optical guide 6 to the condenser lens 5. The numerical aperture of illumination of light guide is adjusted by the diaphragm 4. The light guide 6 has an optical characteristic as shown in FIG. 2. A light illumination time is plotted as abscissa while a temperature, as ordinate. $T_1$ depicts the temperature rise of a lamp house while $T_2$, the temperature rise at the exit of the light guide. From FIG. 2, it is seen that almost all of heat rays are absorbed because the optical length of the light guide is long. The heat insulating filter 3 is interposed so as to absorb some heat rays to thereby prevent the damage of the entrance of the light guide 6. The entrance 7a of a cylindrical mirror 7 is disposed adjacent to the exit of the light guide 6. The cylindrical mirror 7 is interposed between a specimen 8 and the exit of the light guide 6. The outer peripheral surface of the mirror 7 is finished so as to give a mirror surface and then chromium-plated. The entrance 7a of the mirror 7 is so finished as to function as a diffusion plate. 9 is an objective; 10, an eyepiece; and 11, an eye. In order to focus the image of light guide 6, the focal lengths of the collector and condenser lenses 2 and 5 are so determined that light from the illumination source may sufficiently fill both of the openings or diameters of the cylindrical mirror 7 and of the light guide 6. The diameters of these lenses are so determined as to secure the numerical aperture of the light guide 6 which is generally 0.68. The iris diaphragm 4 controls both of the aperture numbers of the light guide 6 and the cylindrical mirror 7. The light guide 6 is about 50 cm. in length and has a transmission factor of about 50%.

The light rays transmitted by the light guide 6 include almost no heat rays. The numerical aperture 0.68 may be maintained while the field of illumination is the diameter (4 mm.) of the light guide. The illuminator of the present invention is very satisfactory when the specimen 8 is directly illuminated for high magnification (40× objective). However, the image is distorted by the light spot of each of the optical fibers of the light guide 6 for a lower magnification (4× objective) because the depth of focus is greater. However, the cylindrical mirror 7 a few millimeters in height is interposed between the light guide 6 and the specimen 8 so that a bright, sharp and clear image may be viewed. Since the entrance surface 7a of the mirror 7 serves as a diffusion plate as mentioned above, the solid angle of the cone of light from the light guide 6 i.e. the numerical aperture of illumination, may be increased, but this numerical aperture also may be decreased by the adjustable diaphragm 4 for lower magnification.

Thus, the specimen 8 may be uniformly illuminated throughout the exit area of the cylindrical mirror 7 with such brightness corresponding to the numeral aperture 1.2. According to the present invention, the uniform and bright illumination may be obtained without switching the condenser and illumination optical system even when the magnification is varied from 4× to 100× objective. In the instant embodiment, the light guide 6 is bent at a right angle, but since the light guide is flexible, it may be bent to any direction at any point at a desired angle, so that the angular position of the illuminator relative to the microscope may be arbitrarily determined. The illumination system of the present invention may be accomplished only by means of the cylindrical mirror 7 which may be bent in a suitable manner, without the use of the light guide 6. However, the light guide 6 will not absorb the heat rays and the cylindrical mirror 7 will not function as a diffusion plate and is not flexible, so that the position of the illuminator to the microscope is rather limited.

According to the present invention, the field of view ranging from 4× objective (low magnification) to 100× objective with 1.25 NA (high magnification) may be uniformly and brightly illuminated without switching the illumination systems and condensers even when a point source of light of high intensity and high temperature is used. The specimen is therefore not heated at all. Furthermore, the brightness (numerical aperture) may be adjusted by means of an intermediate iris diaphragm. The position of the illuminator may be arbitrarily designed.

What is claimed is:

1. A high brightness illuminating device for microscopes comprising a point light source, a condenser system comprising a collector lens and a condenser lens, an iris adjustable diaphragm and a heat ray absorbing filter disposed between the collector lens and the condenser lens, an elongated glass fiber optic light guide disposed between the condenser system and a specimen to be observed, one end of the light guide being close to the condenser lens and adjacent to the image of the light source being focused, and a cylindrical mirror which has a peripheral surface finished so as to give a mirror surface and then plated with chromium and a light diffusing entrance surface, the cylindrical mirror being disposed in alignment with the other end of said light guide and with the light diffusing entrance surface closely adjacent said other end of said light guide, whereby the entrance surface is uniformly illuminated and bright field illumination having the same aperture as said cylindrical mirror and a large aperture angle is obtained with an extremely low temperature rise.

References Cited

UNITED STATES PATENTS

| | | | |
|---|---|---|---|
| 3,361,031 | 1/1968 | Stroud | 350—96 B X |
| 1,880,414 | 10/1932 | Capstaff | 350—96 R X |
| 2,727,435 | 12/1955 | Ferrari | 350—87 |
| 2,185,252 | 1/1940 | Kellogg et al. | 350—96 R X |
| 3,122,602 | 2/1964 | Page | 350—87 |
| 3,188,478 | 6/1965 | Binks | 350—96 B X |
| 3,327,712 | 6/1967 | Kaufman et al. | 350—96 B X |

DAVID H. RUBIN, Primary Examiner

U.S. Cl. X.R.

350—96 B